May 28, 1968 G. P. SNIDER 3,385,456
HAY BALE LOADER AND HAULER
Filed June 1, 1965 17 Sheets-Sheet 1
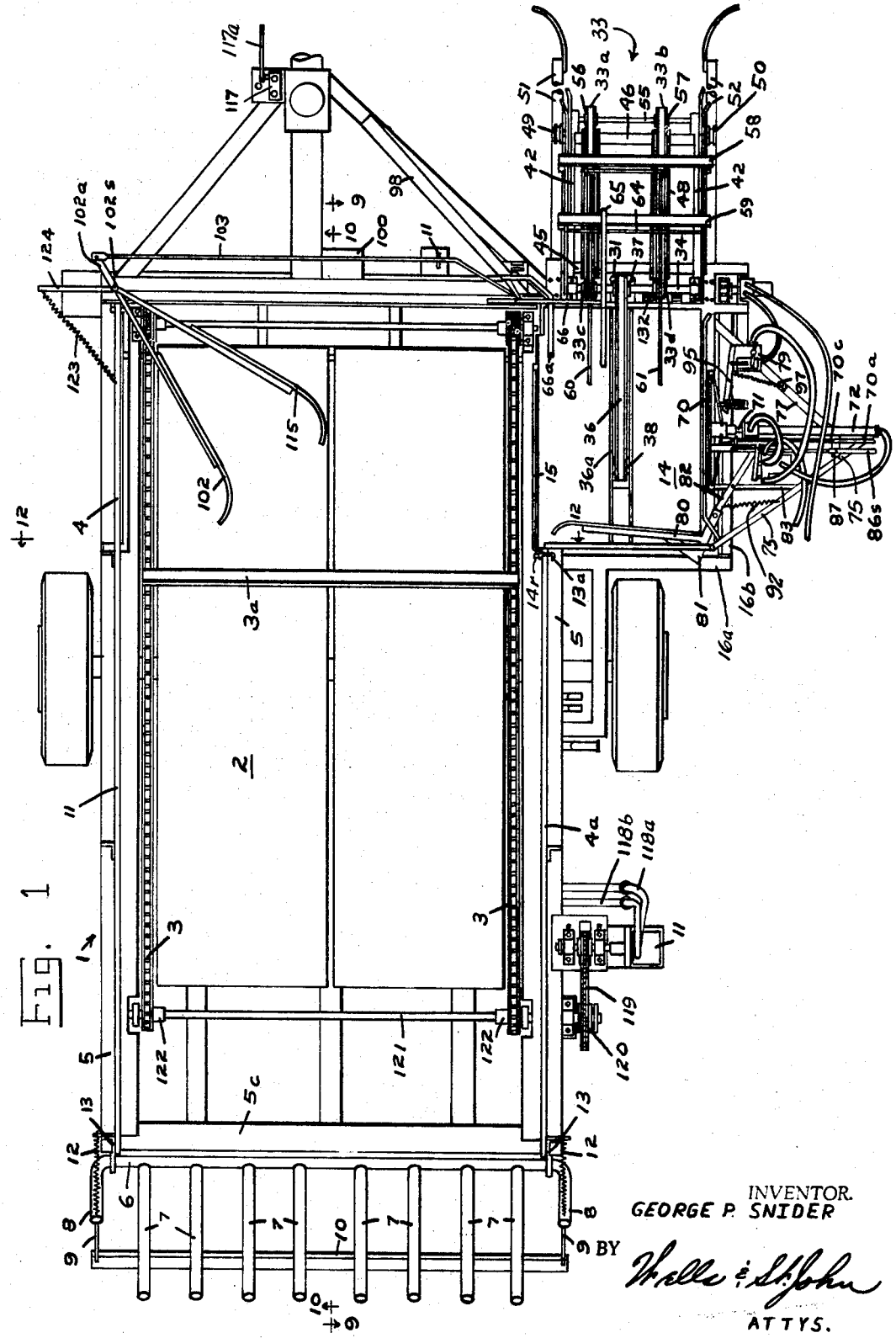
INVENTOR.
GEORGE P. SNIDER
BY
ATTYS.

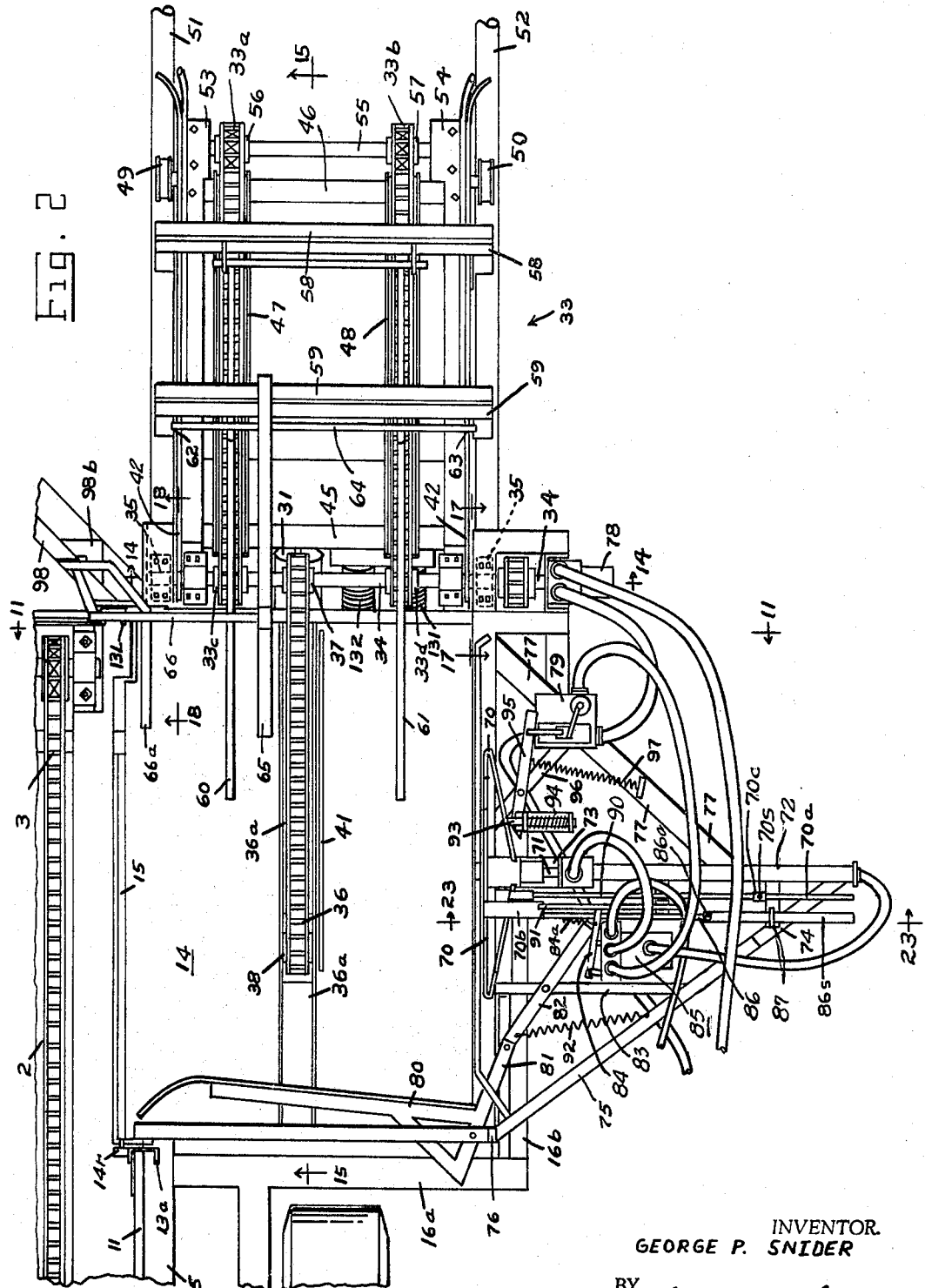

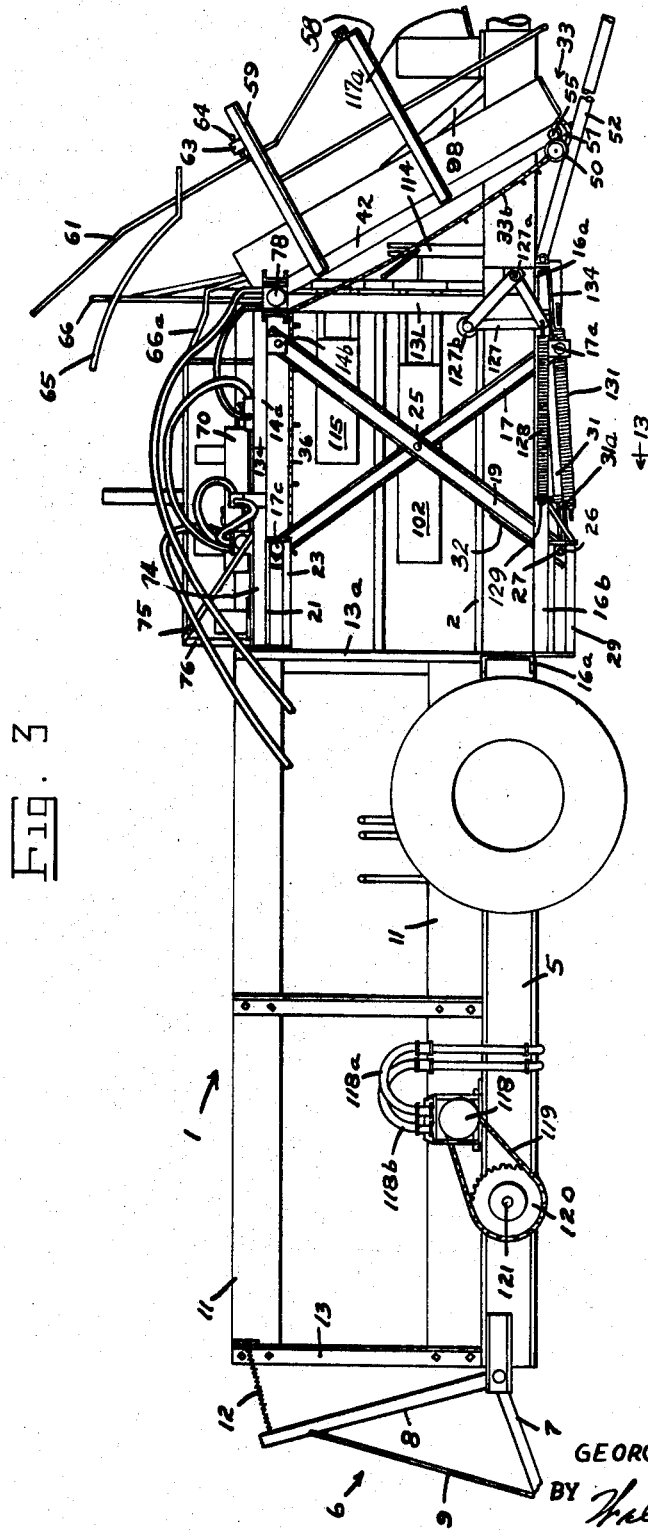

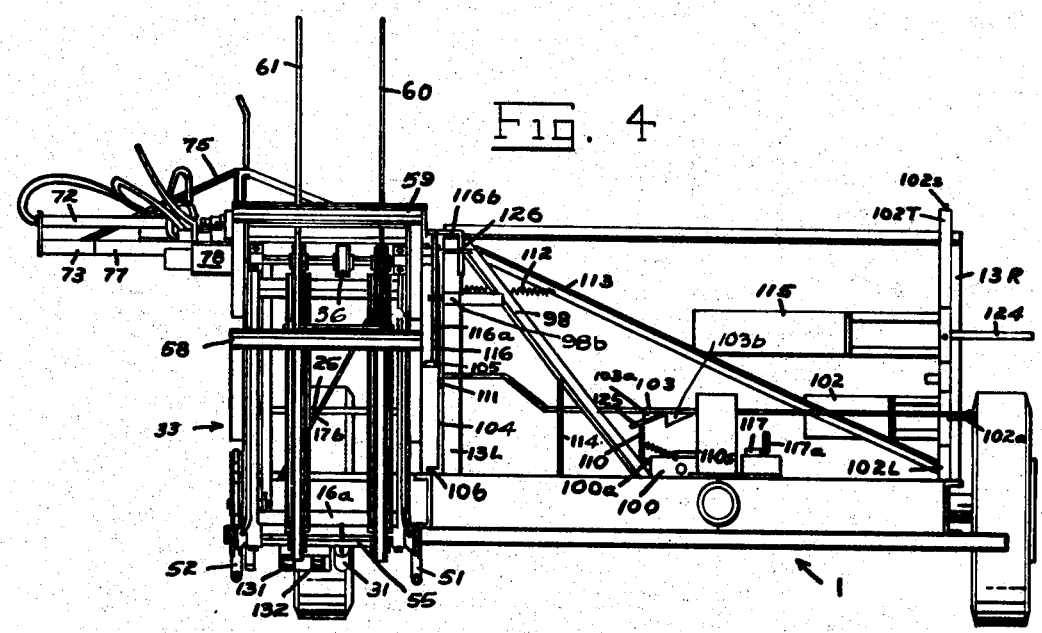

May 28, 1968  G. P. SNIDER  3,385,456
HAY BALE LOADER AND HAULER
Filed June 1, 1965  17 Sheets-Sheet 5
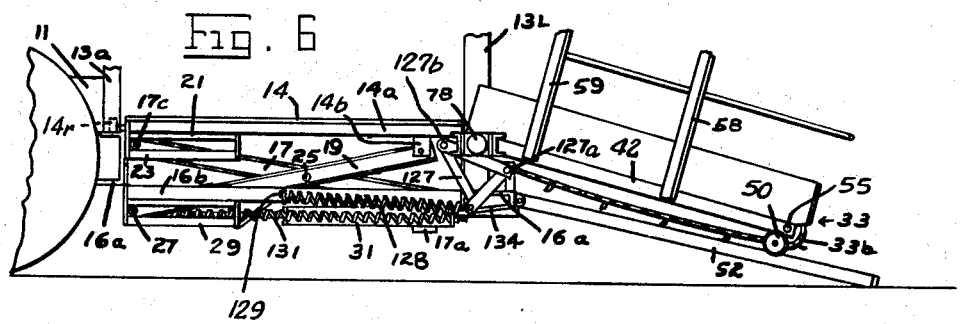
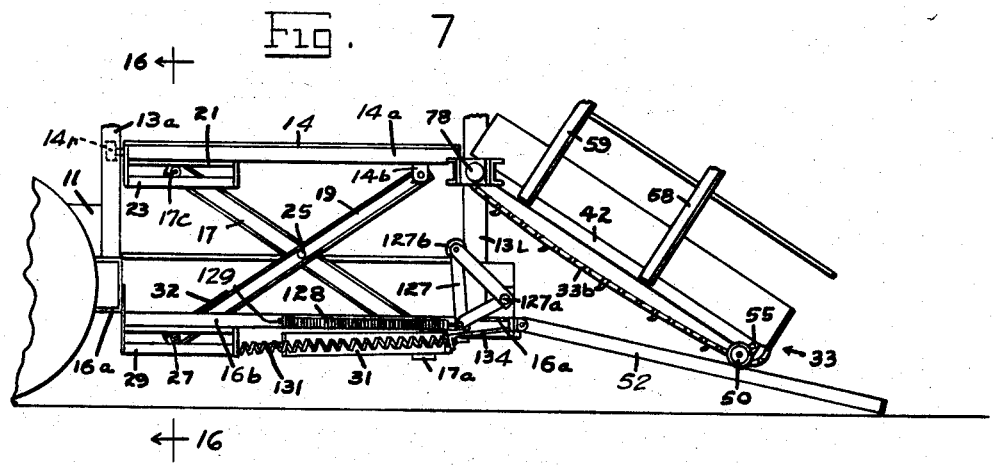
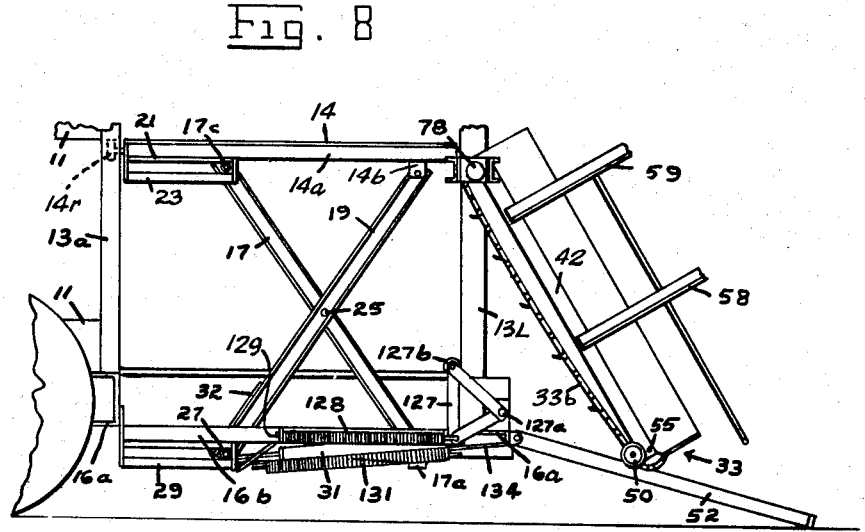
INVENTOR.
GEORGE P. SNIDER
BY
*Wells & St.John*
ATTYS.

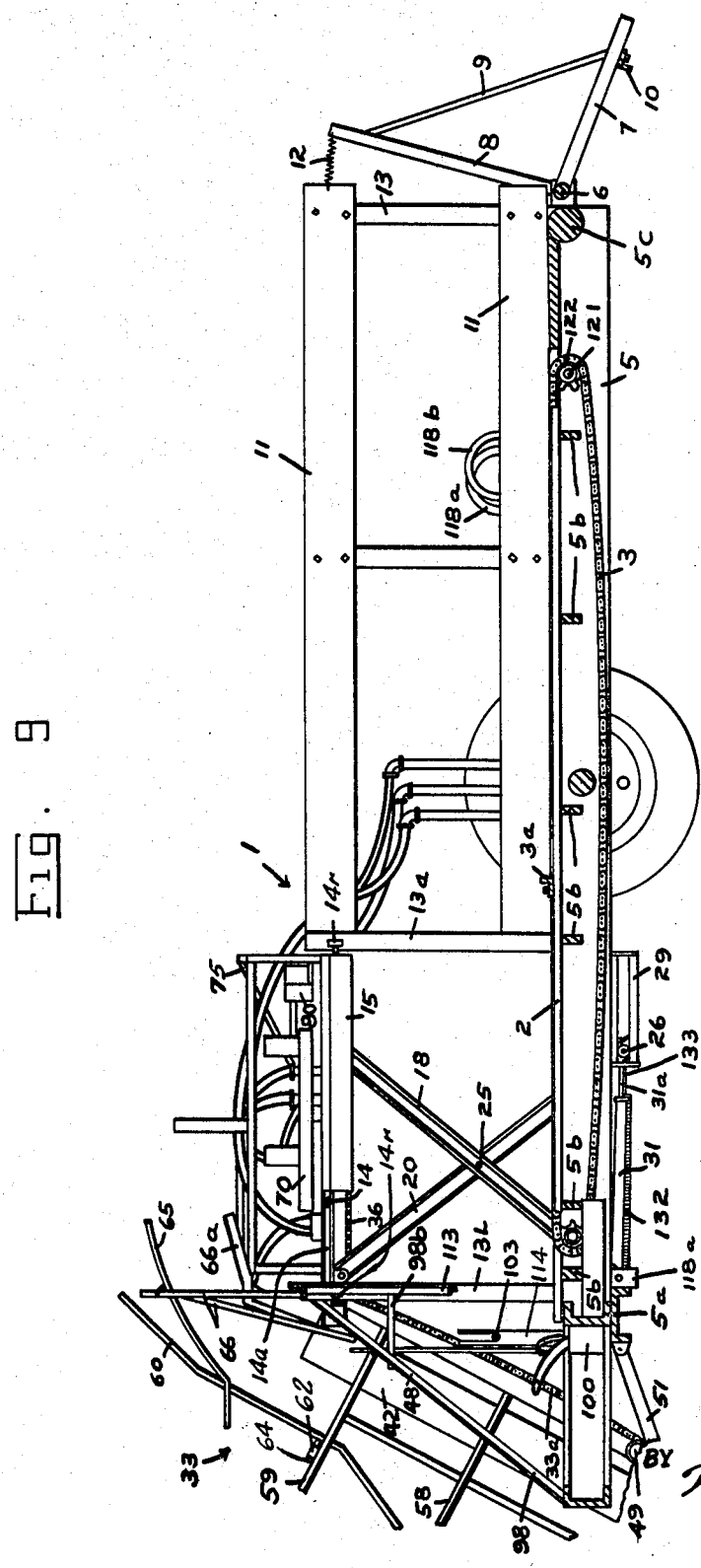

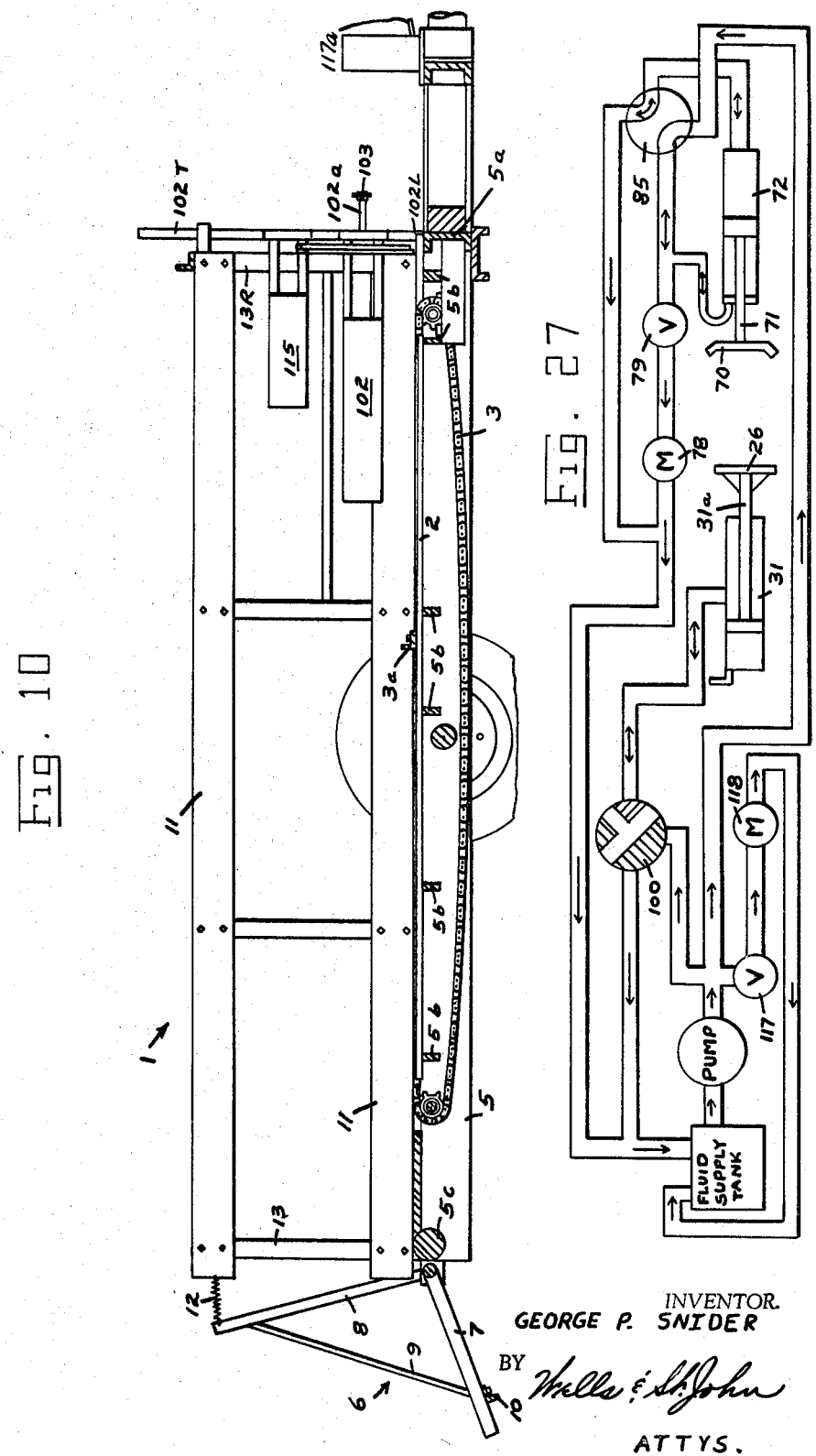

May 28, 1968 G. P. SNIDER 3,385,456
HAY BALE LOADER AND HAULER
Filed June 1, 1965 17 Sheets-Sheet 8

INVENTOR.
GEORGE P. SNIDER
BY
*Wells & St. John*
ATTYS.

INVENTOR.
GEORGE P. SNIDER
BY Wells & St John
ATTYS.

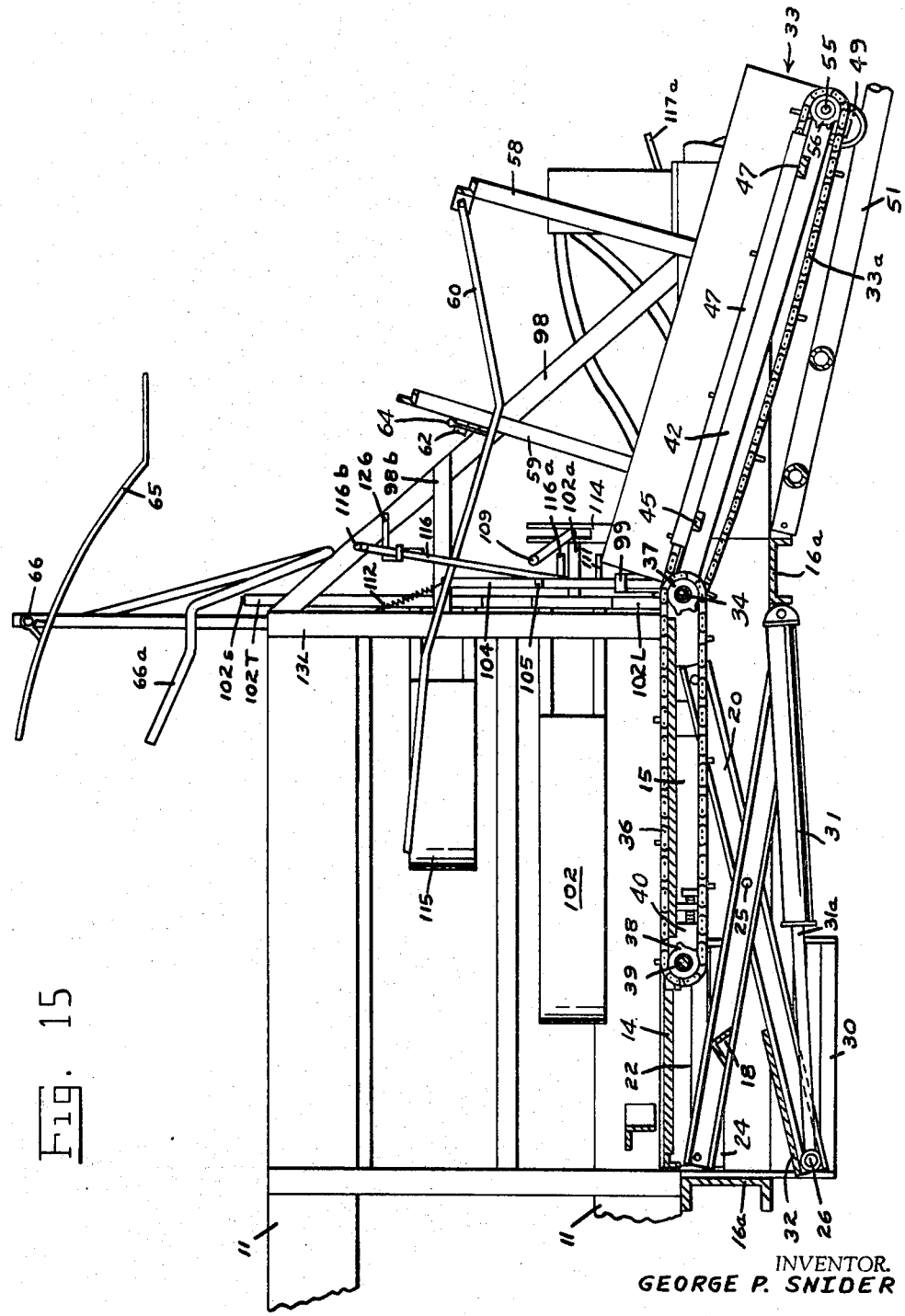

May 28, 1968  G. P. SNIDER  3,385,456
HAY BALE LOADER AND HAULER
Filed June 1, 1965  17 Sheets-Sheet 11
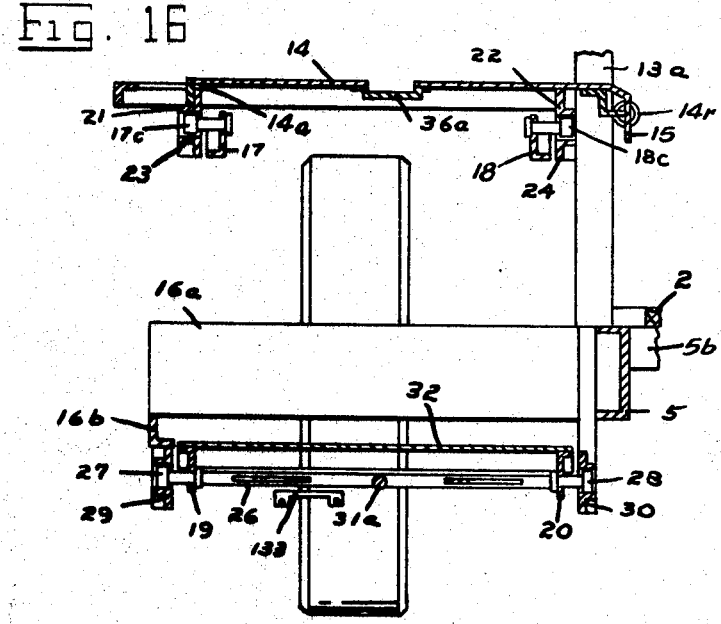
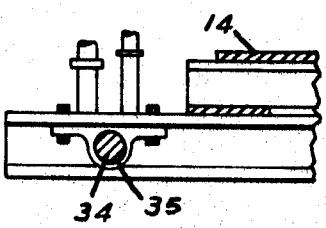
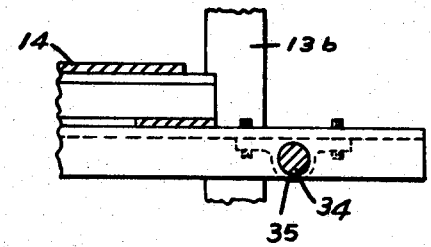
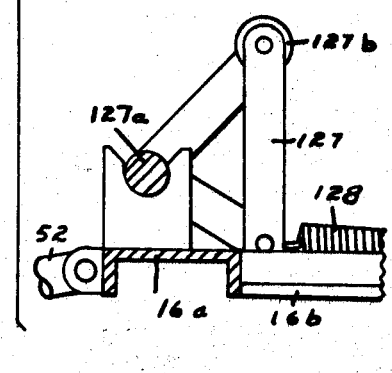
INVENTOR.
GEORGE P. SNIDER
BY
ATTYS.

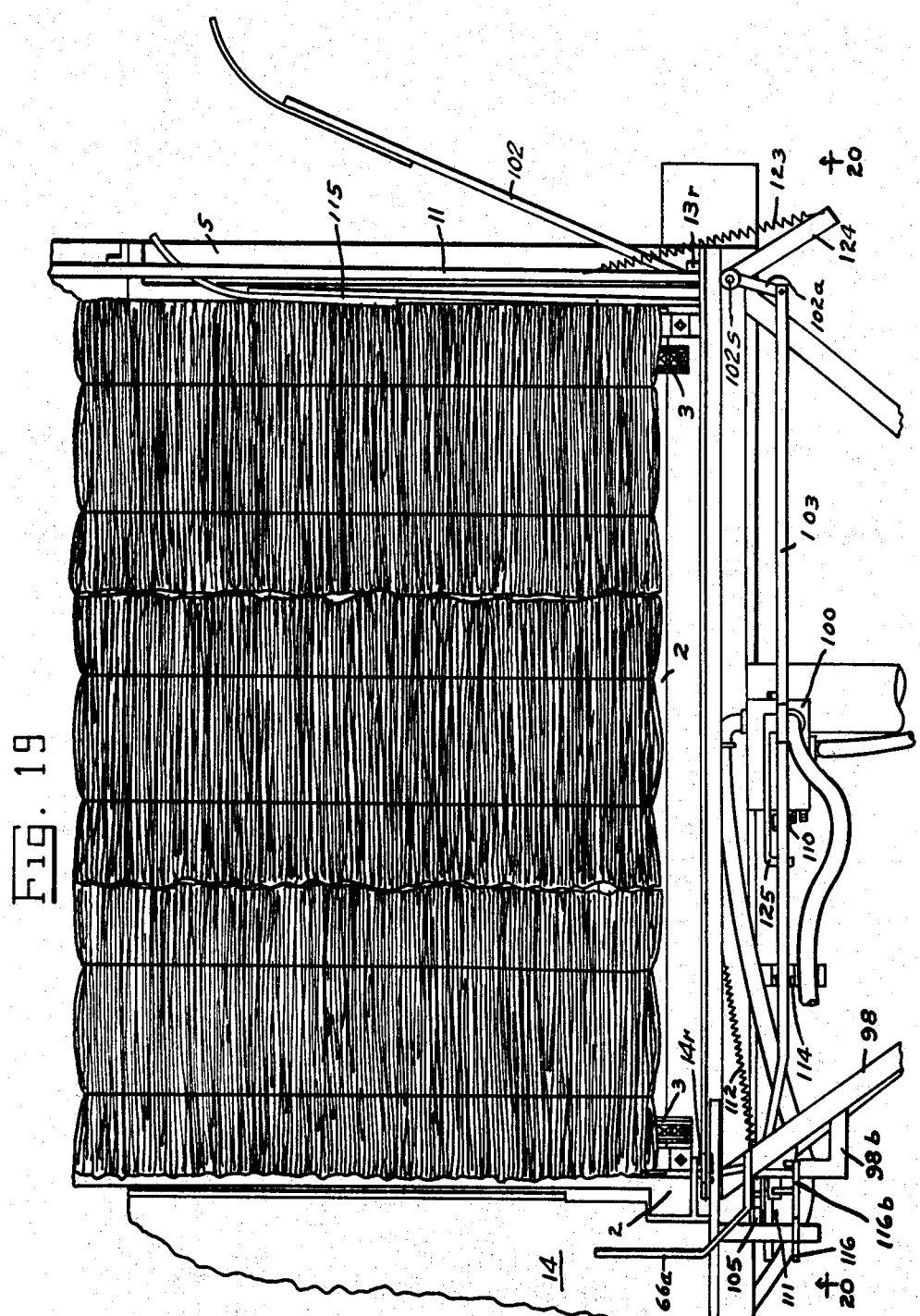

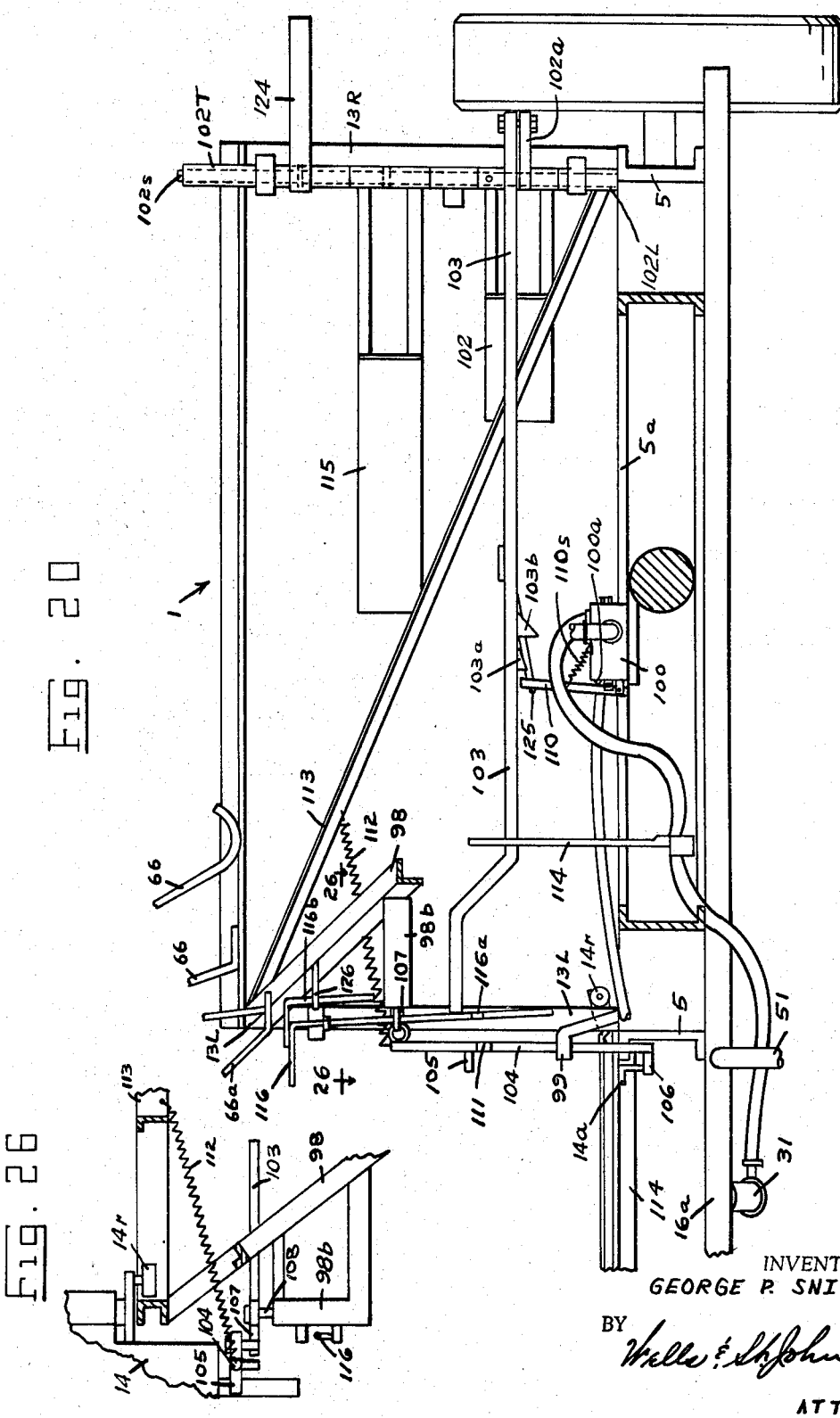

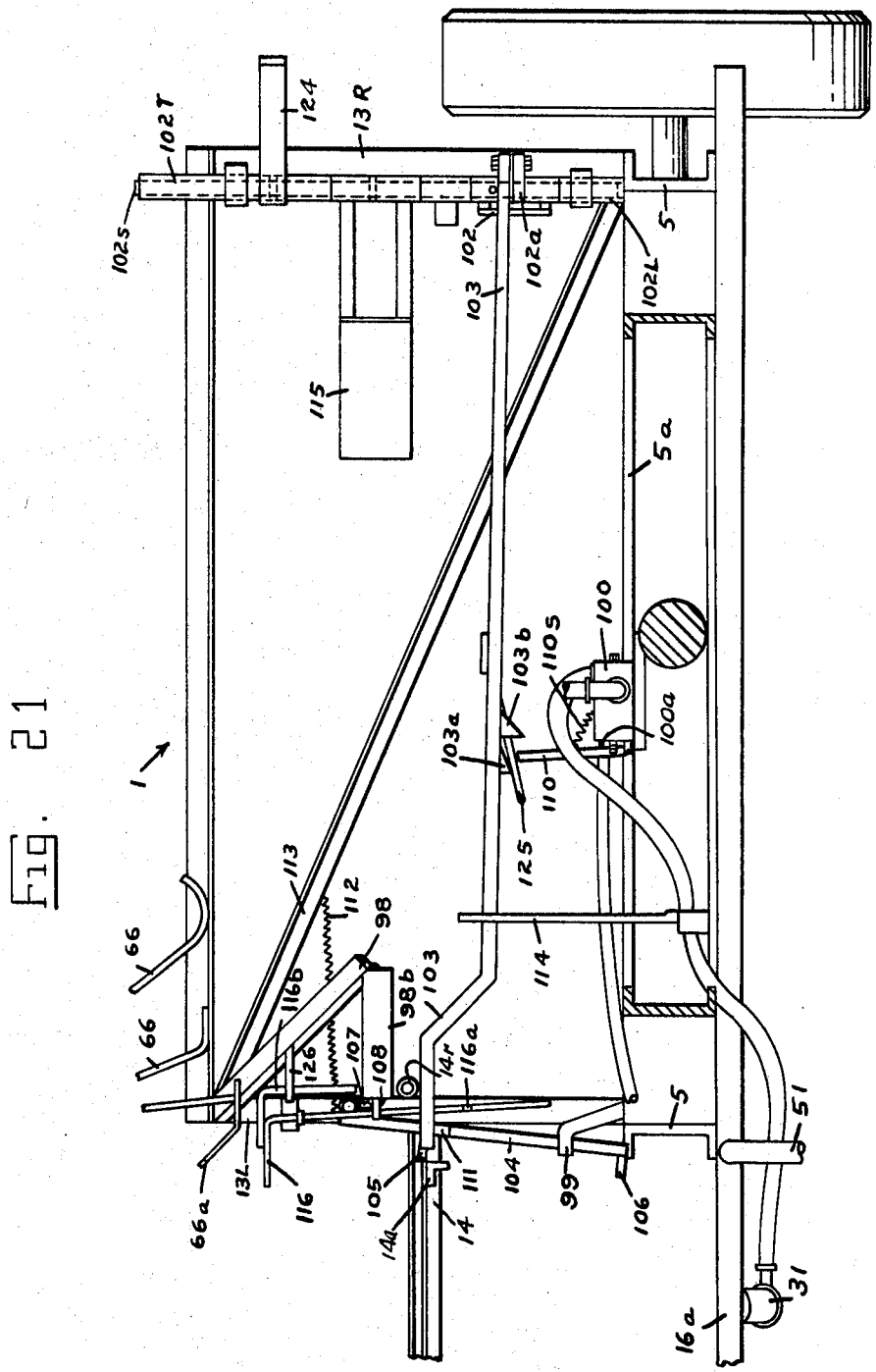

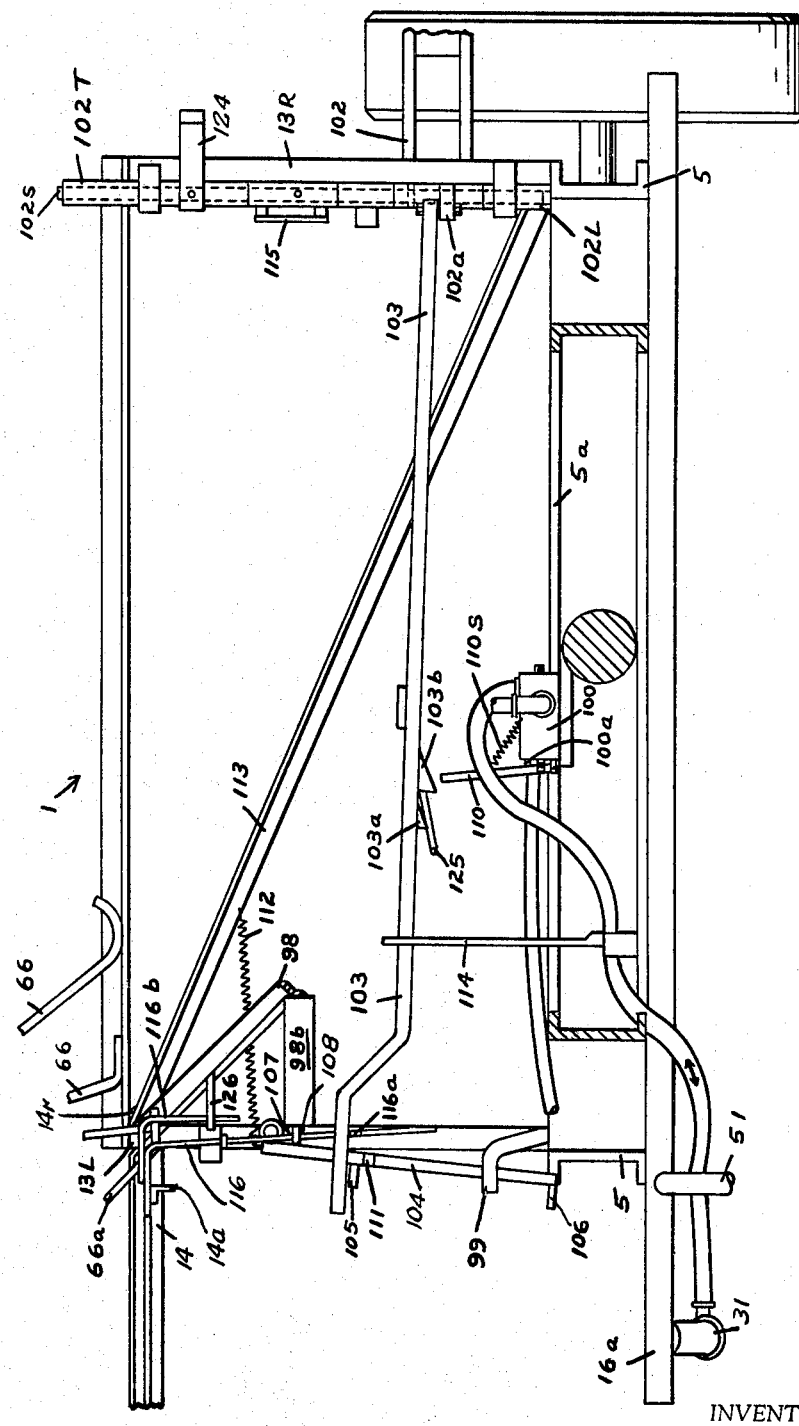

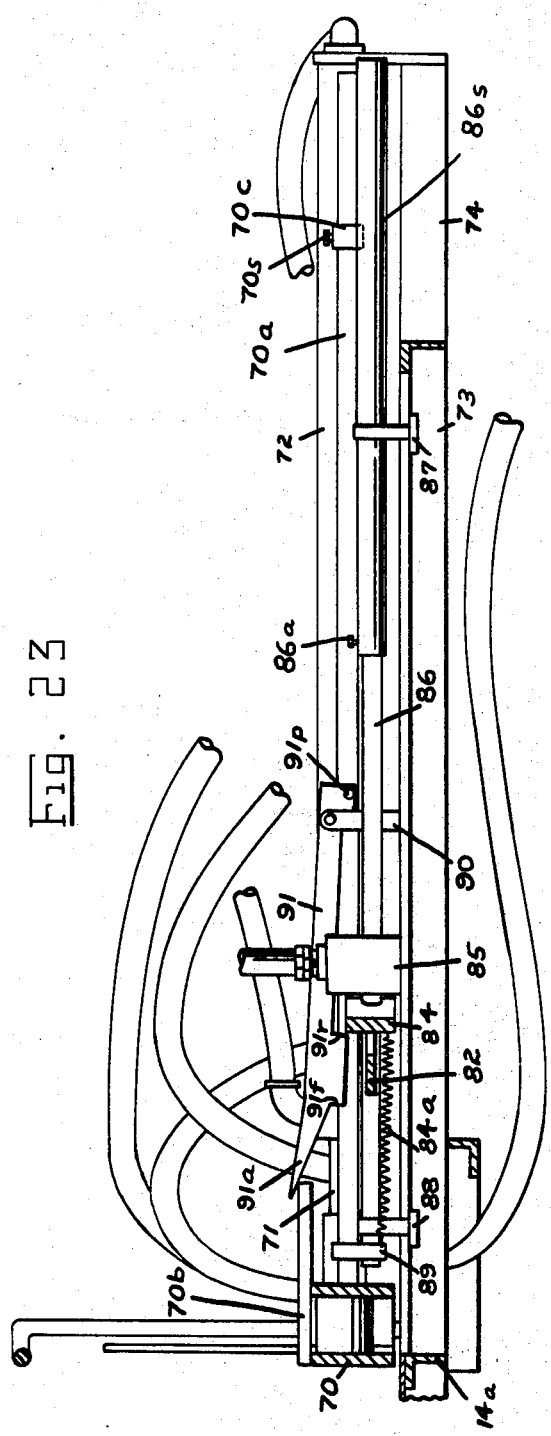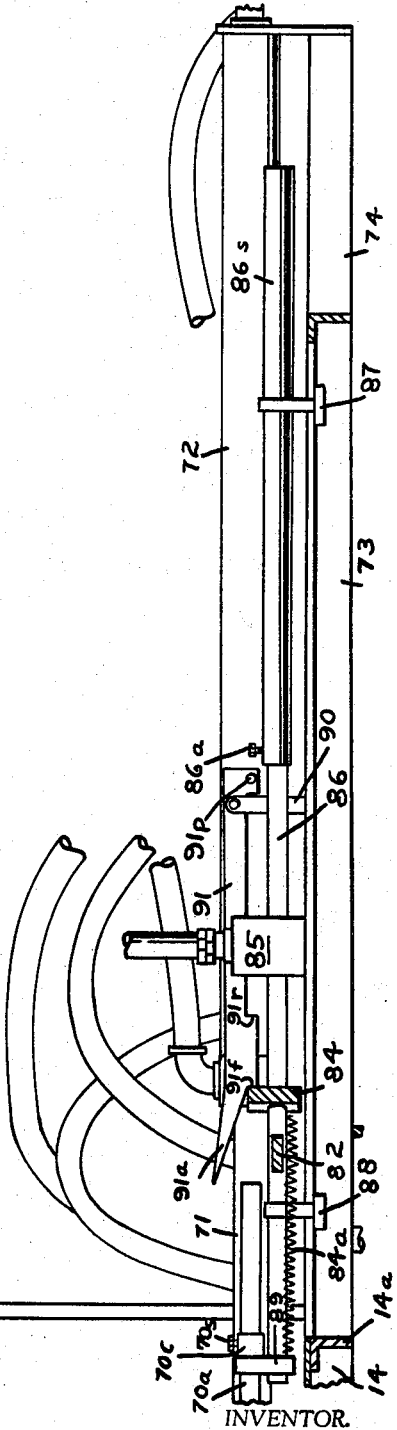
INVENTOR.
GEORGE P. SNIDER
BY
ATTYS.

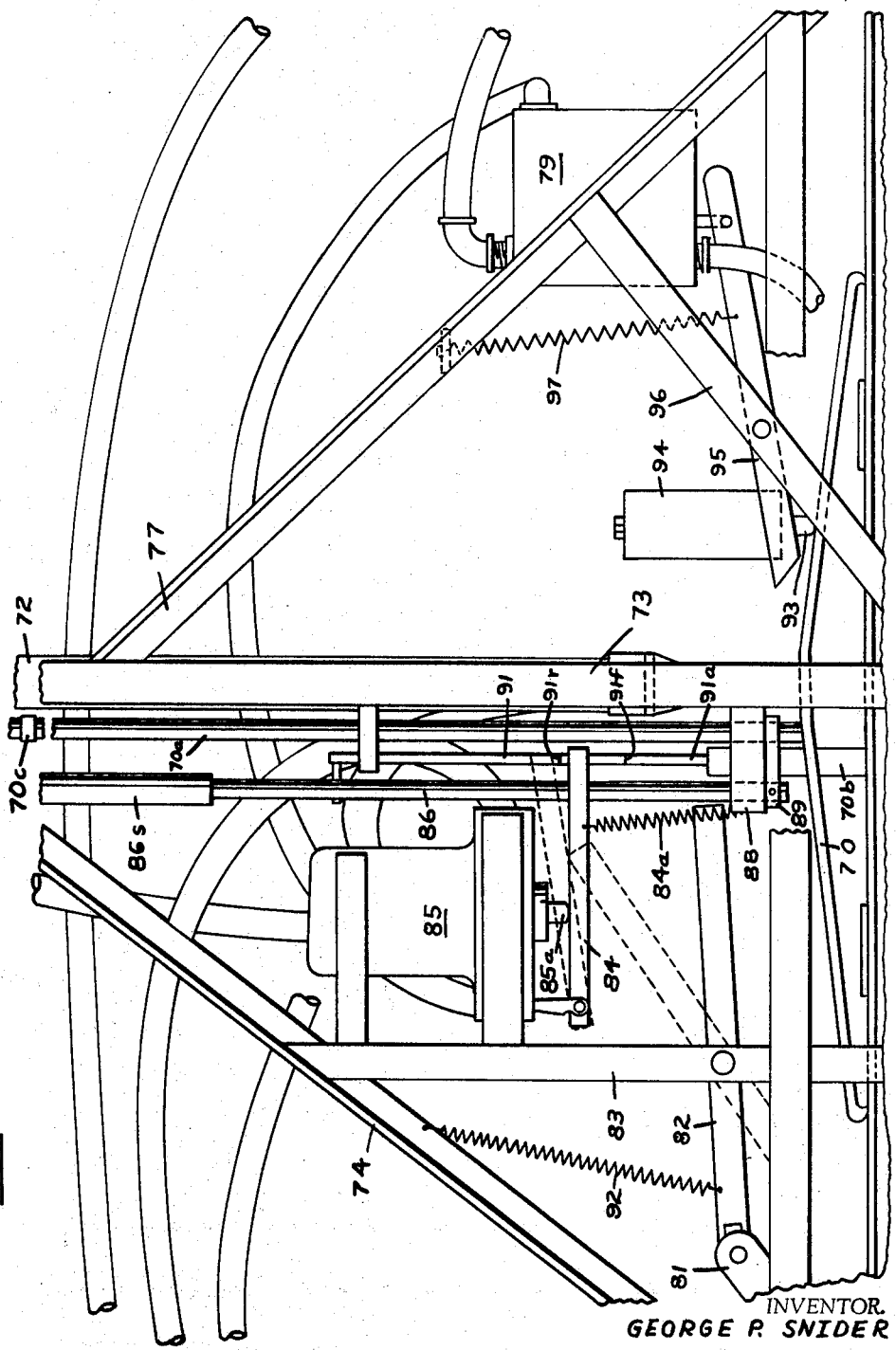

United States Patent Office 3,385,456
Patented May 28, 1968

3,385,456
HAY BALE LOADER AND HAULER
George P. Snider, Brewster, Wash., assignor, by mesne assignments, to Hydraslip, Inc., Okanogan, Wash., a corporation of Washington
Filed June 1, 1965, Ser. No. 460,272
5 Claims. (Cl. 214—6)

ABSTRACT OF THE DISCLOSURE

The device is a machine for loading and stacking hay bales from the positions where they are left in the field by the hay baler, upon the floor of a vehicle for transport from the field and for moving the stacked bales on the floor rearwardly on the vehicle floor. The machine embodies a trailer vehicle 1 provided with a floor 2. A cross bar 3a extends across the floor. Chains 3 at the sides of the floor 2 are power driven to move bales on the floor rearwardly. A bale pick up mechanism is mounted alongside the floor near the front thereof. This mechanism comprises a platform 14 movable upward from the level of the floor 2 to a second level one bale depth above the floor and a third level two bale depths above the level of the floor. The platform has an endless elevator conveyor 33 pivoted on the front end thereof and extending forwardly therefrom. The front end of the conveyor 13 is movably carried on a pair of guide pipes 51 and 52 which receive the bales endwise between them and guide the bales onto the conveyor 33 as the vehicle advances. The platform has means 36 thereon to move a bale received thereon from the conveyor 33 rearwardly. A trip lever 80 on the platform 18 is actuated by a rearwardly moving bale. This lever when actuated stops the conveyors and causes a pusher 70 to move over the platform 14 and push the bale thereon transversely off the platform to leave it over the floor 2.

Control mechanism including a lever 102 is provided on the vehicle whereby to elevate the platform 14 when it has moved enough bales onto the floor 2 to make a row across it. When the lever 102 is actuated, it actuates a hydraulic circuit to raise the platform to its second level. The bale loading operation is repeated until a second row of bales covers the first row on the floor. These bales actuate a second control lever 115 and it causes the hydraulic circuit to raise the platform 14 to its third level. The bale loading operation is repeated to place a third row of bales on the first two rows. Then the chains 3 and bar 3a move the bales rearwardly and the platform 14 is lowered to the floor level. The loading is repeated until the floor is covered with bales three layers deep. To clear the floor the chains 3 are actuated to push the bales rearwardly off the floor 2.

---

This invention relates to a machine for loading hay bales that are lying in the field on to a trailer and hauling them to a stacking area. It is the purpose of the invention to provide such a machine wherein a trailer vehicle having a deck on which bales may be stacked and having means thereon to move the stacked bales lengthwise thereon also carries a bale pick-up conveyor at one side thereof with a platform receiving bales individually from the conveyor and having means thereon to push each bale over to the trailer deck, the platform being elevatable with the rear end of the conveyor from a position substantially level with the trailer deck to a plurality of higher levels whereby the bales may be stacked on the trailer deck.

It is also a purpose of this invention to provide such a machine wherein the trailer deck has bale engaged control devices thereon operable to actuate means to elevate the platform when one or more layers of bales cover that part of the trailer deck which is aligned with the platform.

It is also a purpose of this invention to provide the combination of a bale elevator operable to pick up the bales and elevate them to various heights, a platform to which the rear end of the elevator is pivoted, conveyor means on the platform to move elevated bales thereon rearwardly, a lateral pusher operable when the bale is moved rearwardly against a stop to push the bale sidewise off the platform onto a load carrying vehicle, means for driving the elevator and conveyor together, means operable from the pusher to stop the conveyor and elevator while the pusher removes a bale on the platform and means operable upon such removal to start the elevator and conveyor.

Other and more detailed objects and advantages of this invention will appear from the following description and the accompanying drawings illustrating a preferred form of the invention. It should be understood however that the drawings and description are illustrative only and are not intended to limit the scope of the invention insofar as it is limited by the claims.

In the drawings:

FIGURE 1 is a plan view of a trailer vehicle embodying the invention;

FIGURE 2 is a plan view on an enlarged scale of the bale loading platform carried by the vehicle;

FIGURE 3 is a side view of the trailer vehicle with the platform in raised position;

FIGURE 4 is a front end view of the machine;

FIGURE 5 is a rear end view of the machine;

FIGURES 6, 7 and 8 are somewhat diagrammatic views showing three loading positions of the bale pick-up conveyor and bale loading platform;

FIGURE 9 is a sectional view taken on the line 9—9 of FIGURE 1;

FIGURE 10 is a sectional view taken on the line 10—10 of FIGURE 1;

FIGURE 15 is a fragmentary sectional view taken on the line 15—15 of FIGURE 2;

FIGURE 16 is a fragmentary sectional view taken on the line 16—16 of FIGURE 7;

FIGURE 17 is an enlarged fragmentary sectional view on the line 17—17 of FIGURE 2;

FIGURE 18 is an enlarged fragmentary sectional view on the line 18—18 of FIGURE 2;

FIGURE 19 is a fragmentary plan view looking down on the front end of the bale carrying vehicle when it has received its second layer of bales;

FIGURE 20 is a somewhat diagrammatic front view of the bale receiving vehicle taken substantially along the line 20—20 of FIGURE 19 showing the parts when the bale loading platform is in its lowermost position ready to receive and place a bale on the floor of the vehicle;

FIGURE 21 is a view like FIGURE 20 but showing the parts as they appear when the first row of bales have been placed on the floor of the vehicle and the loading platform has been raised to position to slide a second row of bales over the first row;

FIGURE 22 is a view like FIGURE 20, but showing the parts as they appear when the second row of bales have been placed on top of the first row and the loading platform has been raised to position to slide a third row of bales over the second row;

FIGURE 23 is an enlarged fragmentary sectional view taken on the line 23—23 of FIGURE 2 showing the mechanism controlling the pushing of bales from the loading platform;

FIGURE 24 is a view like FIGURE 23 but showing the parts in a changed position;

FIGURE 25 is a fragmentary bottom view looking up at the mechanism shown in FIGURES 23 and 24;

FIGURE 26 is a fragmentary sectional view taken on the line 26—26 of FIGURE 20; and FIGURE 27 is a diagrammatic view showing the hydraulic circuit for the machine.

Figure 11:
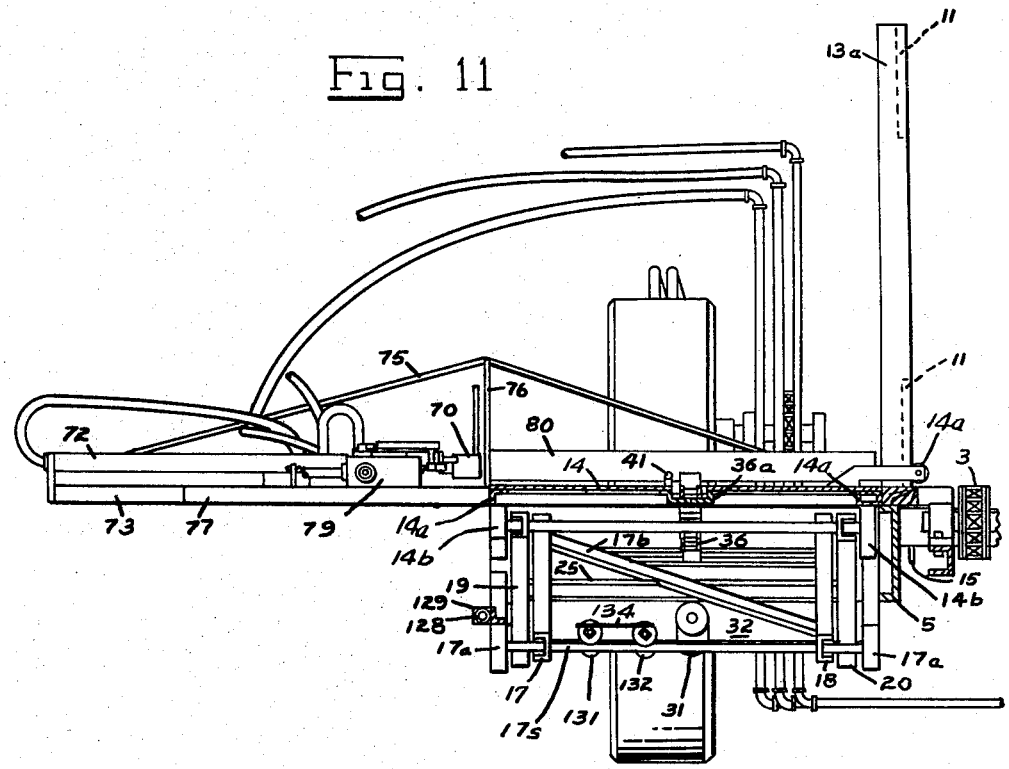
FIGURE 11 is a sectional view on the line 11—11 of FIGURE 2.
Figure 12:
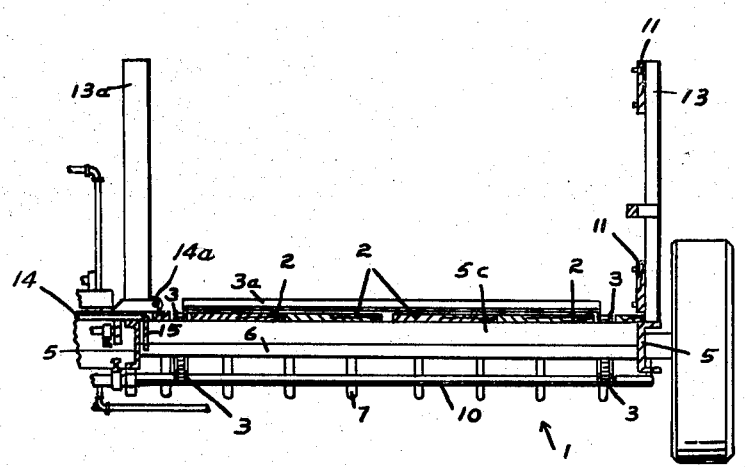
FIGURE 12 is a sectional view on the line 12—12 of FIGURE 1.

The machine embodies a bale carrying vehicle 1 which is adapted to be propelled by a tractor or other power means. It has a floor 2 thereon and a cross bar 3a extending across the floor 2 driven by chains 3 that are sunk in the floor 2. The frame of the vehicle is made of side beams 5, front beam 5a, cross bars 5b and a rear rod 5c. The vehicle also has a pivoted rearwardly extending bale lowering member 6 which is provided with spaced fingers 7. This member is normally held up off the ground by uprights 8 at the sides, braces 9 leading from the uprights 8 back to a cross bar 10 that connects the fingers 7 and springs 12 from the uprights 8 to the rear posts 13 of the side panels 11. The function of the member 6 is to lower the stacks of bales to the ground.

At the right side (looking forward) of the floor 2 the front portion of the side panel 11 is left off to provide space for a bale to move from a bale supporting platform 14 onto the vehicle 1. Upright channels 13a and 13L (FIGURE 9) provide guides for rollers 14r on the platform 14. The platform 14 has one edge extending over the adjacent frame beam 5 and is provided with an apron 15 that is adopted to extend down between the floor 2 and the platform 14 when the platform 14 is down. The platform 14 can be raised to two higher levels for the purpose of pushing bales over other bales already on the floor 2.

The mounting of the platform 14 is by means of a frame that is extended out from the frame of the vehicle 1. This frame comprises two cross beams 16a and a longitudinal beam 16b together with the adjacent side frame 5. This frame 16 carries the four supporting levers 17, 18, 19 and 20 that support the platform 14 for movement vertically. See FIGURES 5-8 inclusive.

The levers 17 and 18 are pivoted at their lower forward ends on the framework by brackets 17s and a shaft 17s. These levers 17 and 18 are provided with cross brace 17b. The upper ends of the levers 17 and 18 carry rollers 17c and 18c which press up against rails 21 and 22 (not shown) that are provided on the platform 14 and thus support the rear end of the platform. The rollers 17c and 18c (not shown) are guided by lower rails 23 and 24 (not shown) which are mounted on the platform 14.

The levers 19 and 20 have their front ends pivoted to the platform 14 at the front end thereof by pivots 14b which are mounted on side rails 14a of the platform 14. These pivots 14b preferably are directly over the pivots 17a and 18a. The levers 19 and 20 are pivoted to the levers 17 and 18 at their midpoints by a cross rod 25. The levers 19 and 20 extend down to a cross rod 26 which has rollers 27 and 28 (not shown) thereon that ride on rails 29 and 30 (not shown) carried by longitudinal beam 16b of the frame and by side frame 5. A sheet metal brace plate 32 is provided across the levers 19 and 20 near their lower ends.

The mechanism just described provides a scissors type support for the platform 14 which can be used to raise the platform 14 by pulling the cross rod 26 toward the front beam 16a of the framework. A hydraulic jack 31 is secured to the front beam 16a and has its piston 31a connected to the cross rod 26 so that when the piston is drawn into the cylinder it pulls the lower ends of the levers 19 and 20 toward the front to raise the platform 14. When the piston is pushed out it moves the lower ends of the levers 19 and 20 to the rear to lower the platform 14.

The platform is counterbalanced by two springs 131 and 132 that are secured at their rear ends to the cross rod 26 by a bracket and have their front ends connected to a bracket 134 on the frame member 16a.

Figure 13:
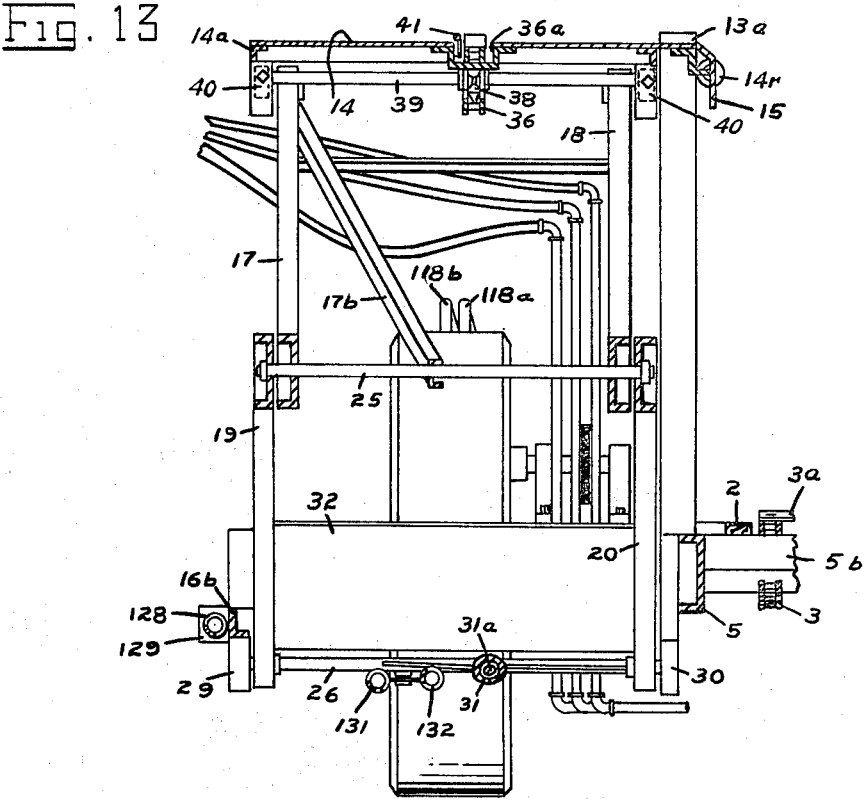
FIGURE 13 is a fragmentary sectional view taken on the line 13—13 of FIGURE 3.
Figure 14:
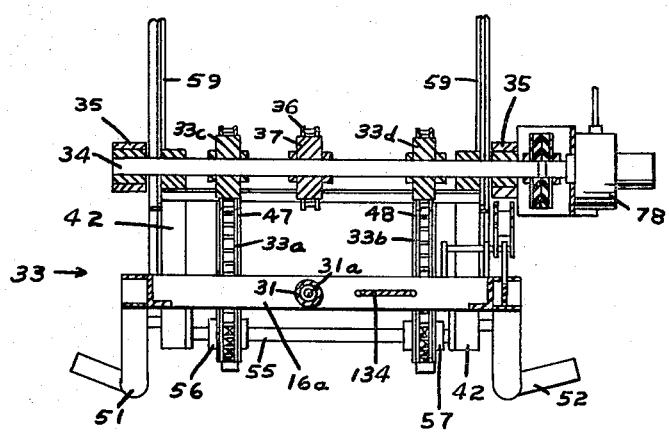
FIGURE 14 is a fragmentary sectional view taken on the line 14—14 of FIGURE 2.

The platform 14 has an elevator conveyor 33 pivoted to the front end thereof by means of a cross shaft 34, the ends of which are journalled in bearing blocks 35 which are secured to the front end of the platform 14. See FIGURES 2, 3, 9, 13, 14, 17 and 18. The platform 14 also has a bale conveyor chain 36 carried on a sprocket wheel 37 which is fixed to the cross shaft 34. The conveyor chain 36 runs in a slot 36a provided in the platform 14 and extends back about two thirds the length of the platform 14 to a rear sprocket 38 that is mounted by a shaft 39, the ends of which are mounted in adjustable blocks provided in front of the channels for the rollers 17c and 18c. These blocks are adjustable toward the rear to keep the conveyor chain 36 tight. The platform 14 has a rod 41 secured thereon alongside the slot 36a so as to keep the bale strings that run lengthwise around the bale from catching on the upright projections of the conveyor chain 36.

The elevator conveyor 33 comprises two chains 33a and 33b which are carried on sprockets 33c and 33d on the shaft 34 so that when the shaft 34 is rotated, the elevator conveyor 33 and the platform conveyor 36 will travel in unison. Two sides frames 42 are pivoted to the cross shaft 34 and they carry cross members 45 and 46 that support channels 47 and 48 and the conveyor chains 33a and 33b. The lower ends of the side frames 42 carry rollers 49 and 50 which extend out to ride on a pair of pipes 51 and 52 which guide the bales on the ground into alignment with the elevator conveyor 33. The side frames 42 are provided with bearings 53 and 54 for a cross shaft 55 which carries sprocket 56 and 57 for the conveyor chains 33a and 33b. The side frames 42 support upright frames 58 and 59 which carry a pair of bale guides 60 and 61 that are pivoted on the frame 58 and extend up through the upper upright frame 59 and upwardly beyond the frame 59 over the front end of the platform 14. The upright frame 59 has two stops 62 and 63 which engage a cross bar 64 connecting the guides 60 and 61 to limit the downward movement of the guides 60 and 61 and the top piece of the upright frame 59 limits the upward movements of the guides 60 and 61. In addition I provide a spring arm 65 which is mounted on an arm 66 that extends up from the front corner post 13L on the main vehicle frame 1. The spring arm 65 is positioned so that, when the platform 14 is in its highest position, the arm 65 directs bales elevated by the conveyor 33 into horizontal position as they leave the elevator conveyor 33 and causes them to lie on their sides on the platform 14. A second guide 66a is also provided on the frame 1 along the edge of the platform 14 which is closest to the floor 2 to keep the bales from tipping off the elevator toward the floor 2 when the platform 14 is in the highest position.

In order to get the bales off the platform 14 I provide a pusher bar 70 which is carried by a piston rod 71 that operates a cylinder 72. See FIGURES 2 and 23-25 inclusive. This cylinder 72 is positioned about midway of the length of the platform 14 and has its front end supported by a bracket 73 extending from the platform 14 and has its rear outer end supported by the bracket 73 and a brace 74 that extends from the rear end of the platform 14 diagonally outward to meet the bracket 73 and is held against downward bend by a strap 75 that extends from the top of a pedestal 76 at the rear part of the platform to the outer end of the brace 74. Forwardly extending brace 77 extends from the cylinder 72 forward to the front end of the platform 14 where it is secured.

A control mechanism is provided by which the action of the pusher 70 is coordinated with the operation of the elevator conveyor 33 and the platform conveyor 36 to stop the elevator conveyor 33 and the platform conveyor 36 before the pusher 70 is operated and to start them again as soon as the pusher has operated to push the bale off the platform 14 and return to its starting position. To accomplish this a hydraulic motor 78 is provided for the cross shaft 34 and its operation is controlled by a valve 79 which also controls the supply of hydraulic fluid to the cylinder 72. The system employed is a hydraulic circuit which will be described later wherein the hydraulic fluid is supplied from a pump continuously but when the cylinder 72 or the motor 78 is not using the fluid it goes back to the supply tank for the pump.

A trip lever 80 (FIGURE 2) is pivoted on the pedestal 76 and it is positioned above the platform at about the right level to engage the central portion of a bale advanced by the platform conveyor 36. This trip lever has an arm 81 which is connected to a pivoted lever 82 which is pivoted on a cross frame member 83 that extends out from the platform 14 to the brace 74. This lever 82 is adapted to engage a valve operating lever 84 for a valve 85. A spring 84a urges the lever 84 away from the valve 85. The supports 73–74 carry a rear guide 87 for the sleeve 86s of a control rod 86. A front guide 88 also supports the control rod 86 for sliding movement. The spring 84a is connected to a bracket 89 which is fixed to the end of the control rod 86 that is closest to the pusher 70. The bracket 89 slidably receives a rod 70a that is fixed to the pusher 70. This rod 70a has a collar 70c adjustably secured thereon by a set s crew 70s so that when the pusher 70 is advanced by the piston 71 to near its limit the collar 70c engages the bracket 89 and moves the control rod 86 with the pusher.

A pedestal 90 on the support 73 pivotally mounts a latch and release lever 91 for the valve operating lever 84. The member 91 has a bevelled free end 91a that is adapted to engage a bar 70b on the pusher 70 to be lifted when the pusher 70 is retracted to allow a bale to be fed onto the platform 14. The lever 91 has two shoulders, a front shoulder 91f adapted to hold the lever 84 retracted away from the valve 85, and a rear shoulder 91r adapted to hold the lever 84 in position to push a valve stem 85a toward the valve 85 and reverse it. When the latch and release lever is raised by the pusher carried bar 70b the valve stem 85a and the spring 84a hold the bar 84 halfway between the shoulder 91f and 91r. This is neutral position for the valve 85 and shuts off the supply of fluid to the rear end of the cylinder 72. The advance of the pusher 70 to its limit for pushing a bale off the platform 14 causes a stop 86a on the rod 86 to engage a pin 91p on the lever 91 and lift it to remove the shoulder 91r from the lever 84 so as to free the valve lever 84. The valve lever 84 is pulled forward by the spring 84a from a position behind the backstop 91r of the latch lever 91 all the way across the deep part of the latch lever 91 by the spring 84a so that the latch lever 91 drops behind the valve lever 84 and holds it in position to reverse the connections for the cylinder 72 so its rear end exhausts liquid into the supply tank and the cylinder has fluid supplied to its front end to pull the pusher 70 back across the platform 14. As the pusher 70 approaches its starting position again its bar 70b engages the latch lever 91 and lifts the lever to again release the valve lever 84. This allows the valve lever 84 to return to neutral position since at this time there is no bale against the trip 80 and a spring 92 will return the lever 82 to its original position. The pusher 70 on approaching its starting position engages a spring pressed top pin 93 on a bracket 94 which is fixed on an operating lever 95 for the valve 79 to shift this valve into position to direct fluid to the motor 78 and again cause operation of the conveyors 33 and 36 until a new bale engaged the trip lever 80. The lever 95 is pivoted on a frame member 96. A spring 97 holds the lever 95 in position to shut off liquid supply to the motor 78 when the pin 93 is not engaged by the pusher 70.

The operation is repeated until three bales have been shoved from the platform 14 onto the floor 2. When the third bale is shoved on the floor 2 it engages the first bale against a control lever 102 which controls the operation of the platform raising mechanism. See FIGURES 1, 19–22 and 26. The lever 102 is fixed to a shaft 102s having an arm 102a that carries a rod 103 which has a lug 103a thereon to engage a control lever 110 for a valve 100 to supply liquid to the cylinder of the hydraulic jack 31 so as to draw the piston 31a into the cylinder and thus lift the platform 14. The rod 103 slides in a support 114. The platform 14, as it rises, strikes a lug 105 on an upright rod 104 and lifts this rod, the lower end of which was previously pulled down by engagement of the platform 14 with a horizontal extended lug 106 at the bottom of the rod 104. The rod 104 is guided by a guide bracket 99 on the vehicle frame 5 so that it may rock somewhat but it nevertheless limited to a substantially upright position. At its upper end this rod 104 is pivoted to a link 107 which has its other end pivoted on a pivot pin 108 that is carried by a bracket 98b on a front brace 98 for the frame upright 13L. The movement of the bale against the control lever 102 pushed the trip rod 103 endwise so that the end of the rod will overlie a lug 111 on the rod 104 and the lug 103a on the rod 103 will move the lever 110 to open the valve 100 to supply liquid to the jack 31 for raising the platform 14. The lift of the platform 14 against the lug 105 moves the rod 103 and the link 107 up. A spring 112 is mounted in such relationship between the upper end of the rod 104 and a cross brace 113 for the frame upright 13L so as to lift and hold the rod 104 at a level to cause it to lift the trip rod 103 and move its stop 103a out of the way of the valve lever 110 that controls the valve 100. This positions the valve 100 to bypass the liquid around the cylinder and thus hold the platform at this elevation. The lifting of the rod 104 by the spring 112 also moves it to the right (FIGURES 20 and 21) far enough that the lug 105 clears the platform 14.

Now the loading continues with the platform at the height of the top of the bales previously loaded until three more bales are pushed across the platform 14 onto the first three bales. When the last of the second group of bales is pushed over it causes the first of this group to engage another control lever 115 on the shaft 102s. The shaft 102s is pivoted in upper tube 102T on upright 13R and lower tube 102L. This control lever 115, when it is pushed back, rotates the shaft 102s further which moves the trip rod 103 endwise to bring its lug 103b against the valve lever 110 to cause the valve lever to open the valve 100 again and supply additional liquid to the jack 31 to raise the platform 14 further. As the platform 14 is raised it engages a second control rod 116 which is mounted on the brace 98 above the control rod 104 that is now moved by the link 107 back out of the way of the platform and this control rod has a lug 116a which engages the trip rod 103 and lifts it higher to bring its lug 103b above the valve lever 110, allowing the valve 100 to close and shut off liquid supply to the jack 31. The machine is again operated to feed the third row of bales onto the platform 14 and to push them over across the top of the second row of bales.

Now when the third row of bales is positioned it is necessary to move this stack of nine bales rearwardly before further bales can be placed on the floor 2. In order to do this the operator actuates a manual control rod 117a for a valve 117 that directs pressure fluid to a hydraulic motor 118 through conduits 118a and 118b. The motor 118 drives a sprocket chain 119 which in turn drives a sprocket wheel 120 on a shaft 121 which has sprockets 122 thereon for driving the chains 3. When the chains 3 have been advanced about 4 feet the cross bar 3a will have moved far enough to permit a new set of bales to be placed.

When the bales on the floor 2 are moved rearwardly past the levers 102 and 115, a spring 123 (FIGURE 19) connected between an arm 124 fixed to the shaft 102s and the adjacent side frame 11 rotates the shaft 102s to retract the trip rod 103 to the position shown in FIGURE 20. In this position a hook arm 125 on rod 103 brings the valve level 110 to the position shown in FIGURE 20 depressing the spring pressed stop 100a on the casing of the valve 100 and positioning the valve 100 to allow liquid to flow from the jack 31 back to the liquid supply tank. The weight of the platform 14 and the parts carried thereby causes the piston 31a to expel the liquid from the cylinder, thus permitting the platform 14 to drop to its lowermost position.

As the platform 14 drops it allows the control rod 116 to drop too. This rod is guided in its vertical movement by a guide bracket 126 on the brace 98 and an auxiliary rod 116b affixed to rod 116 and guided by the bracket 126 to keep the horizontal upper end of the rod 116 in the path of the platform 14.

The platform 14 does strike the lowermost lug 106 on the rod 104 as it drops and pulls the rod 104 down far enough to swing the link 107 to horizontal position and to bring the spring 112 back to a position where it lies below the level of the pivot of the link 107 to the bracket 98b. The spring 112 then will hold the link 107 in horizontal position to keep the lug 105 on the rod 104 in the path of the platform 14 when it rises again.

The platform 14 is in part counterbalanced by the springs 131 so that its fall is cushioned somewhat as it moves to lower position. To further prevent too sudden a stop at the lowermost position of the platform a triangular frame 127 is pivoted at 127a (FIGURE 3) on the front cross frame 16a. This frame has a roller 127b at its upper corner adapted to engage the member 19 as the platform 14 comes down. At the lower rear corner of the frame 127 a spring 128 is secured. The other end of this spring is attached to a bracket 129 on the side frame 16b. The downward turning of the frame 127 when the weight of the platform 14 is applied to the roller 127b stretches the spring 128. By using the proper strength spring 128 the fall of the platform 14 can be stopped smoothly.

In the diagrammatic showing of the hydraulic circuit the valve numbering is the same as in this description. The operation will now be briefly summarized.

The initial setting of the valve 79 is such that it is supplying fluid to the hydraulic motor 78 to operate the bale elevating conveyor 33 to elevate bales to the platform 14. As soon as a bale reaches the platform 14 it is moved back by the conveyor chain 36 to strike the trip lever 80 which causes the lever 82 to press on the operating lever 84 to cause the valve 85 to supply fluid under pressure to the cylinder 72 to push the piston rod 71 and the pusher bar 70 across the platform 14 and push the bale from the platform 14 onto the floor 2.

In its final forward movement, the pusher bar 70 pulls the rod 86 with it so the lug 86a engages the pin 91p to lift the latch 91R and release lever 84. The lever 84 is thus retracted so that valve 85 can change the flow of fluid to the front end of the cylinder 72 and drain the rear end of the cylinder 72. The pusher bar 70 is thus pulled back.

When the pusher bar 70 first moves forward it releases the lever 95 by moving away from the spring pressed pin 93. This allows the spring 97 to move the lever 95 in a direction to cause the valve 79 to cut off fluid supply to the hydraulic motor 78. The motor is thus stopped to keep conveyors 33 and 36 stationary while the push bar 70 moved the bale off the platform 14. The return of the pusher bar 70 again opens the valve 79 to supply fluid to the motor 78.

When the third bale is pushed onto the floor 2 the first bale engages the lever 102 and causes it to actuate the trip rod 103 and this rod causes the lever 110 to shift the valve 100 and cause it to supply fluid to the jack 31 and thus lift the platform 14. The platform is stopped when it engages lug 105 on the control rod 104 and lifts this rod far enough to cause the lug 111 on the rod 104 to lift rod 103 and thus release the valve lever 110 which is returned by the spring 110s to neutral position, cutting off flow of liquid to or from the jack 31.

The valve 100 is tripped to feed fluid to the jack 31 when the pusher bar 70 is extended, therefore raising of the platform 14 and retraction of the pusher bar 70 takes place at the same time and this action occurs while the motor 78 is stationary so there is no problem of having a bale pushed onto the platform 14 while it is rising.

After the platform 14 is raised to midposition three bales are pushed from the platform 14 over the first layer of three bales. The third bale of this second layer pushes the other two across to cause the first bale of the second layer to move the lever 115 around and extend the rod 103 further so the bigger lug 103a will engage the valve lever 110 and open the valve 100 to supply liquid to the jack 31 again to cause it to again raise the platform 14. This time the platform 14 rises to the position shown in FIGURE 22 where the rod 116 is lifted to cause its lug 116a to lift the trip rod 103 and bring the lug 103b above the valve lever 110 so this valve can return to neutral position again to lock the platform 14 in the uppermost position.

In this position of the platform 14 three more bales are pushed over the second layer of bales on the floor 2 to complete a unit of nine bales. The control rod 117a is then used by the operator to actuate the motor 118 and thereby cause the chains 3 and cross bar 3a to move the nine bale unit rearwardly. As explained hereinbefore this permits the levers 102 and 115 to return the rod 103 to its initial position and cause the hook arm 125 to pull the valve lever 110 far enough back against the spring stop 100a to set the valve in position to drain the jack 31 and allow the platform 14 to lower to start position.

After the three stacks of bales have been completed the vehicle 1 can then be pulled to the stacking area where the chains 3 are again operated to remove the bales from the vehicle. It should be noted that there are three bars 3a on the chains 3 spaced apart slightly more than the length of a bale to enable each of the bale stacks to be pushed on the floor 2.

For larger loads it is only necessary to increase the width and length of the floor 2 and the chains 3 and add more bars 3a.

In the hydraulic circuit the various conduits are shown in such manner as to indicate the direction of fluid flow therein.

It is believed that the nature and advantages of my invention will be clear from the foregoing description.

Having described my invention, I claim:

1. A hay bale loader and hauler comprising a vehicle having a deck floor on which bales may be stacked and having means thereon to move the bales lengthwise thereon;

a bale pick-up mechanism at one side of said floor and connected to the vehicle to be advanced therewith and having means to lift a bale from the ground and move it rearwardly;

said mechanism including a platform positioned to receive each individual bale picked up and to support it for transverse movement thereon toward said floor;

said mechanism also including a conveyor having its rear end pivoted to the platform and its front end supported from the vehicle for movement toward and away from the platform as the platform moves up and down; the vehicle having spaced inclined supports projecting forwardly beneath the conveyor and supporting the front end of the conveyor;

means on said vehicle operable to elevate said platform from a position substantially at the level of said floor to a plurality of higher levels; and means on said platform operable when the platform is at either of said levels to move a bale transversely of the platform from the platform to a position overlying the floor.

2. The device defined in claim 1 wherein said vehicle has means thereon operable by bales moved across the floor to the side opposite said platform to cause said elevating means to raise the platform from one level to the next higher level.

3. The device defined in claim 1 wherein the elevating means is inoperative to raise the platform when the adjacent floor is free of bales.

4. A hay bale loader and hauler comprising a vehicle having a floor on which bales may be stacked;
- a bale pick-up mechanism attached to said vehicle to move therewith;
- said mechanism comprising a vertically movable platform supported by said vehicle alongside said floor and including means to move a bale thereon rearwardly and means to move a bale thereon transversely from the platform to a position overlying the floor;
- said mechanism also comprising a conveyor pivoted on the front end of said platform and inclined downwardly and forwardly therefrom;
- bale guide means secured to the vehicle and extending forwardly beneath said conveyor and in front of it to guide a bale on the ground endwise onto the conveyor;
- the front end of the conveyor being supported by said guide means for movement forward and back thereon;
- elevating and lowering means on the vehicle for said platform including a platform raising and lowering mechanism operable to hold said platform at a plurality of levels, the lower of which is the level of said floor.

5. The device defined in claim 4 with means to cause alternate operation of the conveyor and the means to move a bale transversely from the platform.

References Cited

UNITED STATES PATENTS

| | | | |
|---|---|---|---|
| 2,702,131 | 2/1955 | Leupke | 214—6 |
| 2,720,322 | 10/1955 | Locke | 214—6 |
| 2,768,756 | 10/1956 | Horman | 214—6 |
| 2,792,136 | 6/1957 | Abbott | 214—78 |
| 2,848,127 | 8/1958 | Grey | 214—6 |
| 2,977,002 | 3/1961 | Asp | 214—6 |
| 3,163,302 | 12/1964 | Pridgeon | 214—6 |
| 3,176,858 | 4/1965 | Johnson | 214—6 |
| 3,197,043 | 7/1965 | Unger | 214—6 |
| 3,251,485 | 5/1966 | Fancher | 214—6 |

GERALD M. FORLENZA, *Primary Examiner.*

G. F. ABRAHAM, *Assistant Examiner.*